United States Patent [19]

d'Alayer de Costemore d'Arc et al.

[11] Patent Number: 4,811,323

[45] Date of Patent: Mar. 7, 1989

[54] APPARATUS FOR LOADING AND UNLOADING RECORD DISC PLAYER

[75] Inventors: Stephane M. d'Alayer de Costemore d'Arc, Genappe; Louis P. C. Agostini, Sint-Pieters Leeuw, both of Belgium

[73] Assignee: Staar S.A., Belgium

[21] Appl. No.: 100,621

[22] Filed: Sep. 24, 1987

[30] Foreign Application Priority Data

Oct. 22, 1986 [BE] Belgium .......................... 0/217,321

[51] Int. Cl.$^4$ .......................... G11B 1/00; G11B 25/04
[52] U.S. Cl. .................................................. 369/75.2
[58] Field of Search ........................................ 369/75.2

[56] References Cited

U.S. PATENT DOCUMENTS

| | | | |
|---|---|---|---|
| 3,836,222 | 9/1974 | Kuntze | 312/319 |
| 4,403,317 | 9/1983 | Suzuki et al. | 369/75.2 |
| 4,439,852 | 3/1984 | Hughes | 369/77.2 |
| 4,447,900 | 5/1984 | Schatteman et al. | 369/75.1 |
| 4,509,157 | 4/1985 | Morinaga | 369/75.2 |
| 4,523,680 | 6/1985 | Saito et al. | 206/387 |
| 4,561,084 | 12/1985 | Satake et al. | 369/75.2 |
| 4,631,716 | 12/1986 | Ikedo et al. | 369/75.2 |
| 4,672,598 | 6/1987 | Koken et al. | 369/75.2 |
| 4,692,916 | 9/1987 | Rouws | 369/75.2 |
| 4,706,237 | 11/1987 | Nakayama | 369/75.1 |

*Primary Examiner*—Steven L. Stephan
*Attorney, Agent, or Firm*—Leydig, Voit & Mayer

[57] ABSTRACT

A record disc player apparatus having a front loading drawer supported for in-and-out substantially horizontal movement between an external loading/unloading position and an internal operating position and a support carried by the drawer and engageable with a record disc on the drawer for raising and tilting the record disc into an inclined position with the record disc facing upwardly and toward a front portion of the drawer when the drawer is in the loading/unloading position and for lowering the record disc into a substantially horizontal position before the drawer is moved into the internal operating position to facilitate the user gripping the record disc at its periphery without touching its surface.

21 Claims, 7 Drawing Sheets

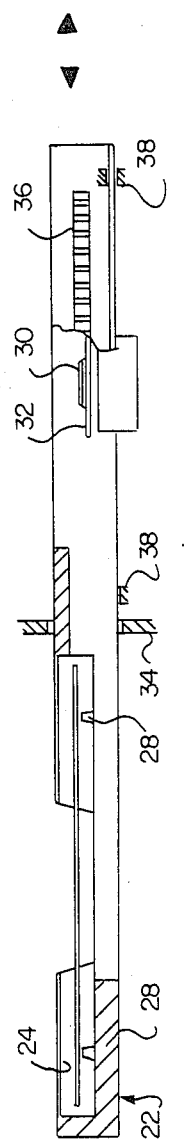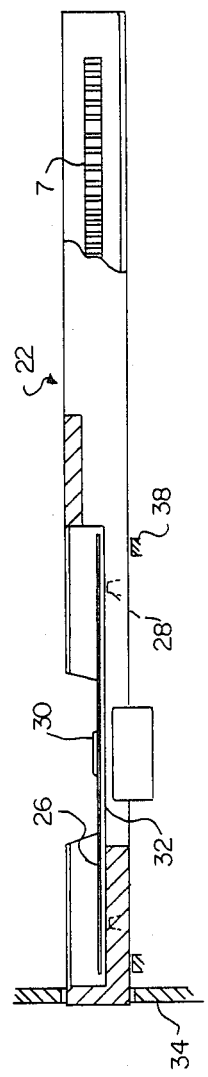
FIG. 1 (PRIOR ART)
FIG. 2 (PRIOR ART)

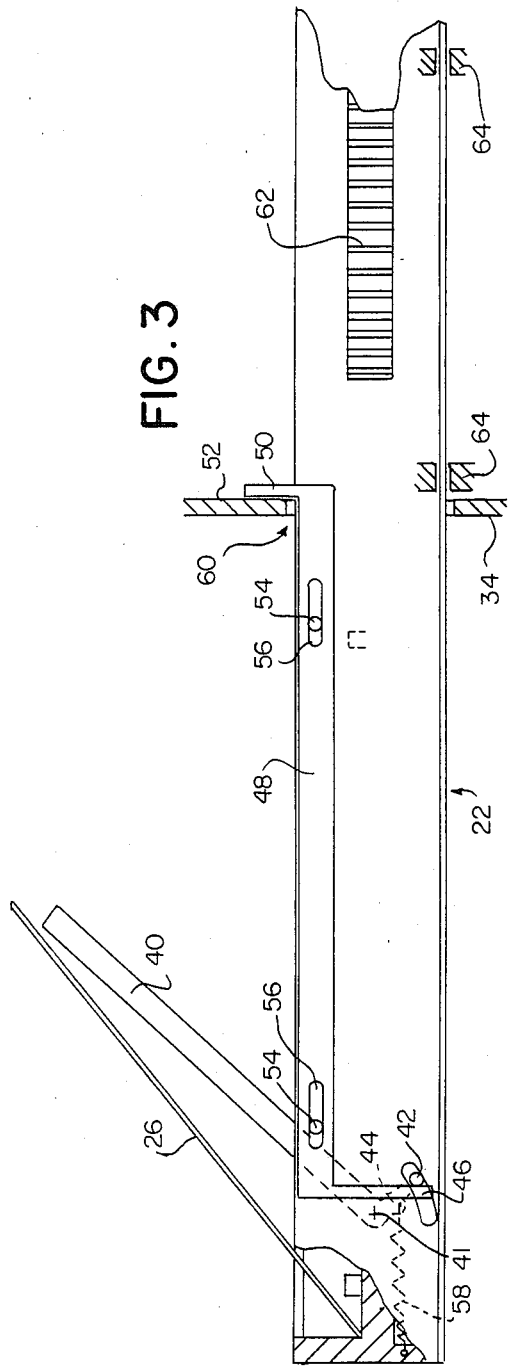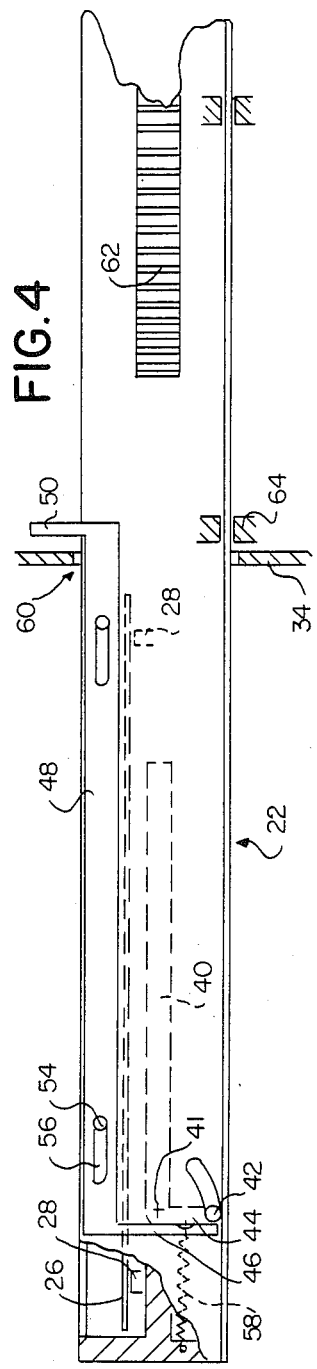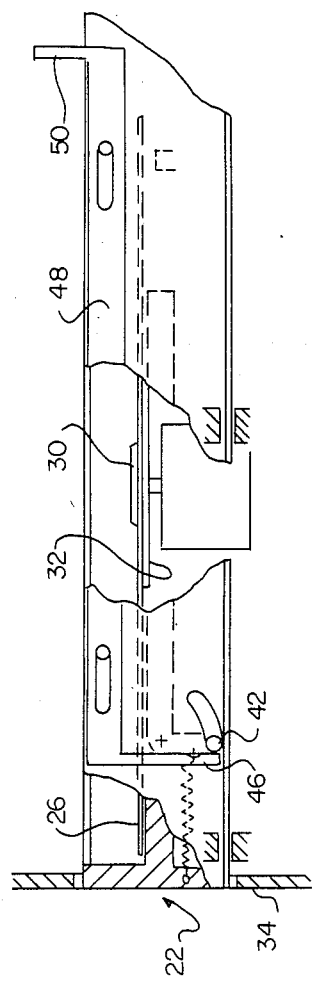
FIG. 3
FIG. 4
FIG. 5

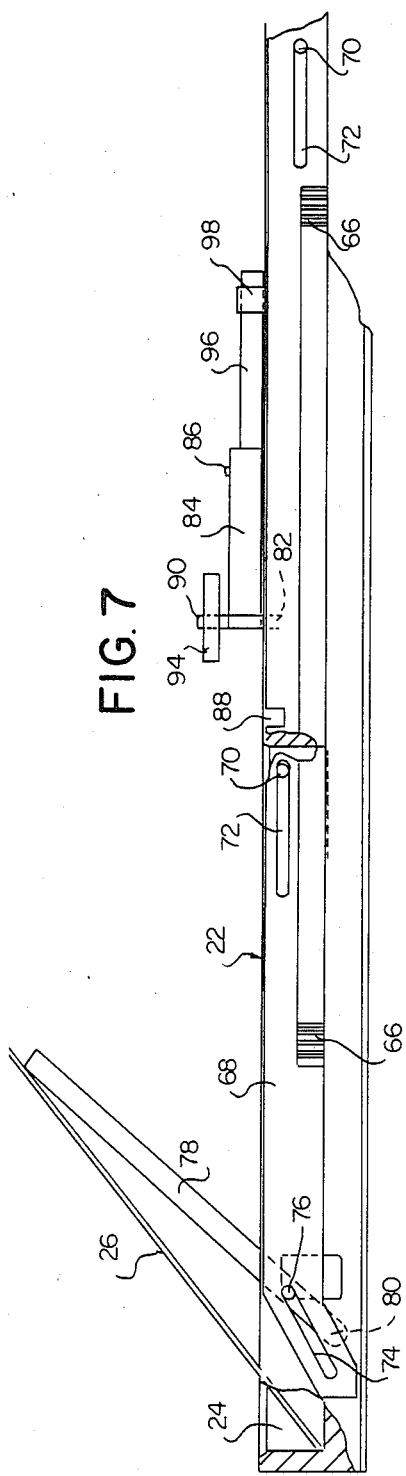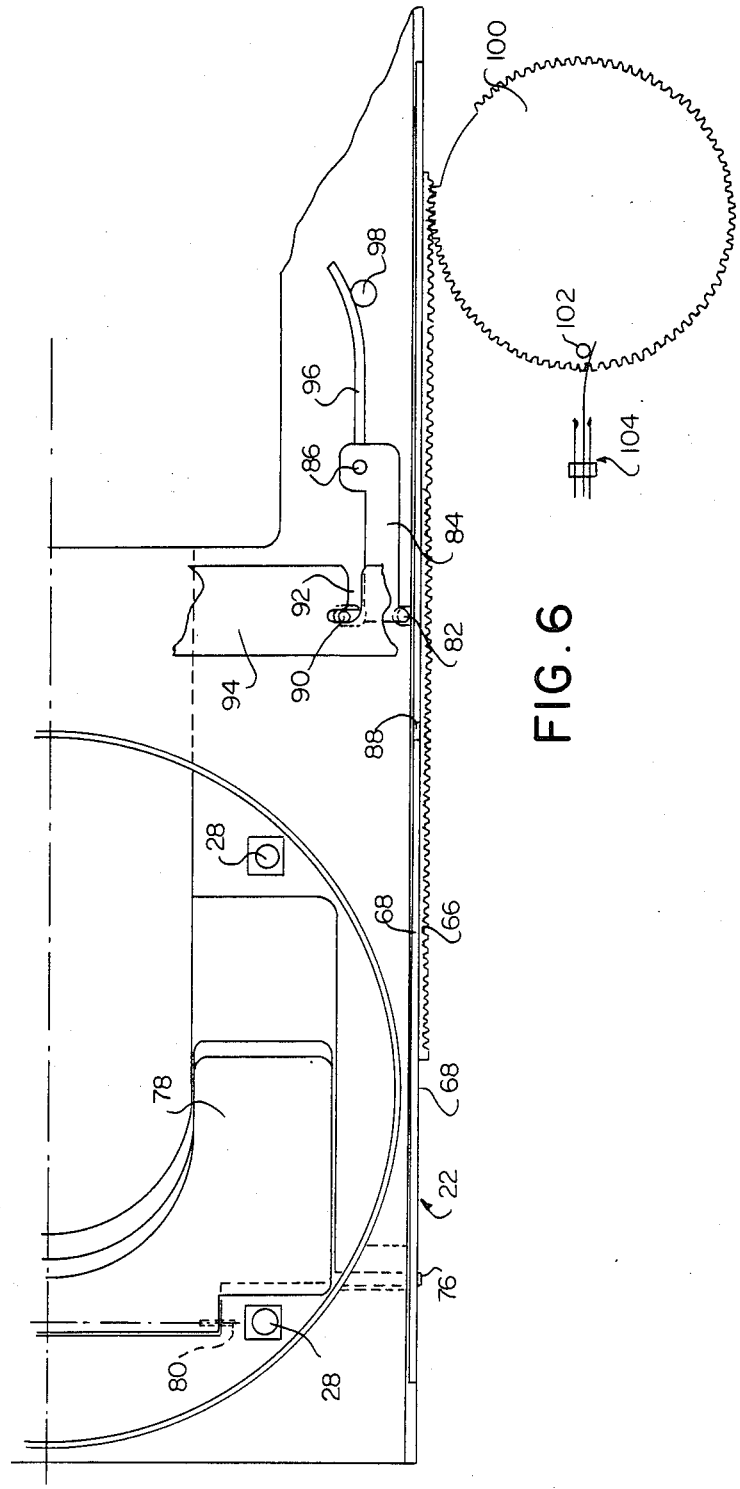

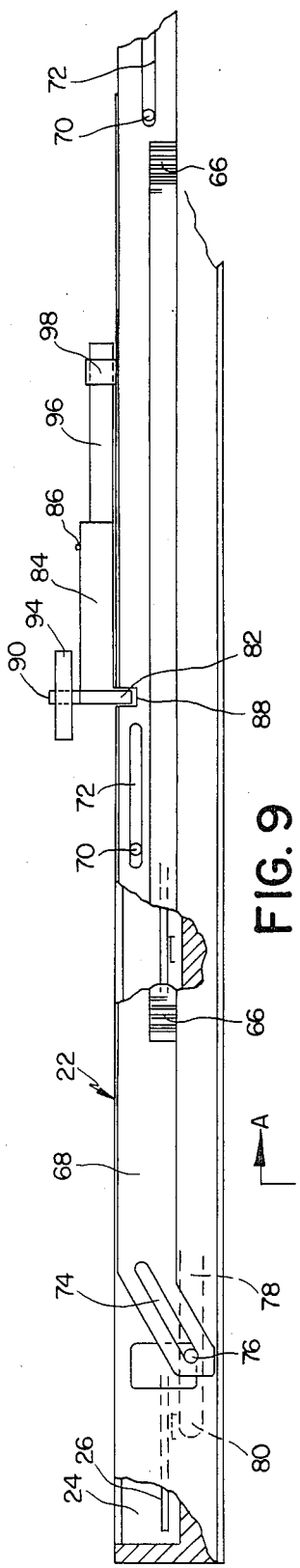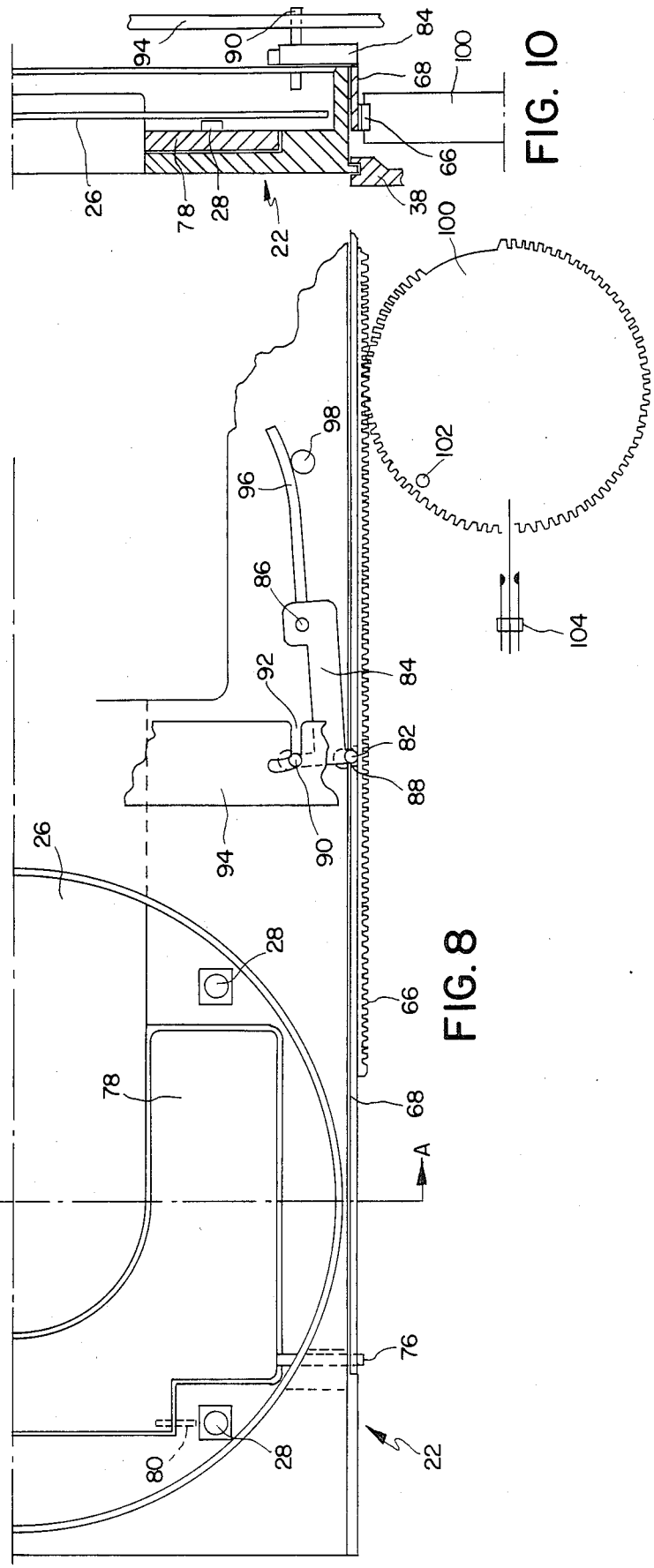

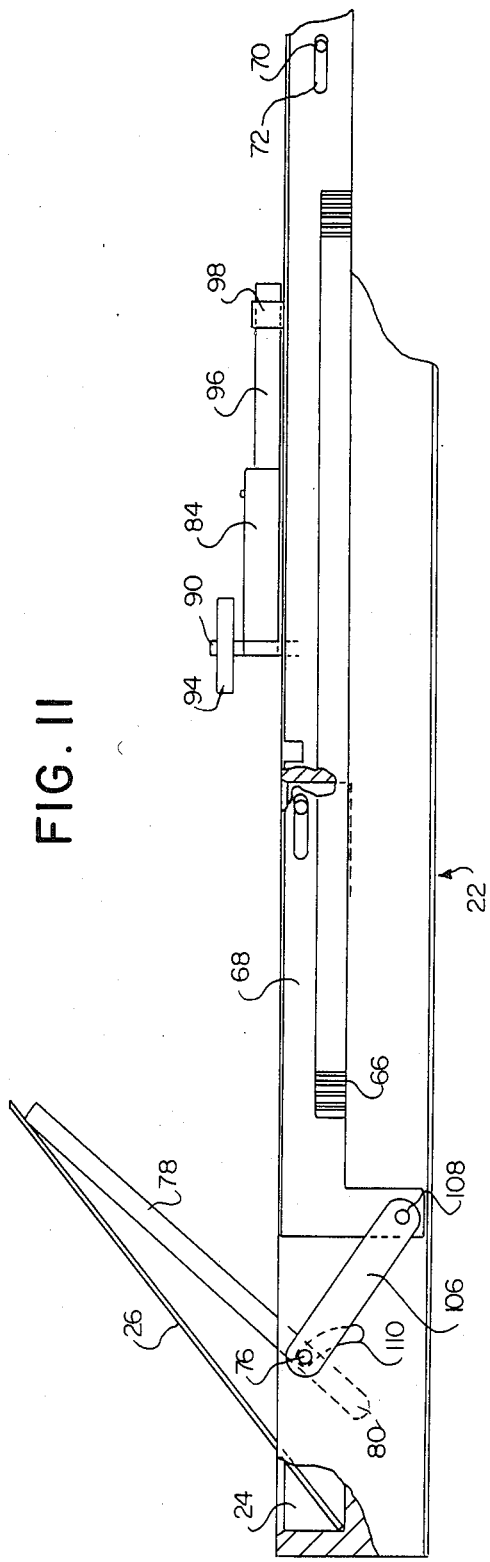
FIG. II

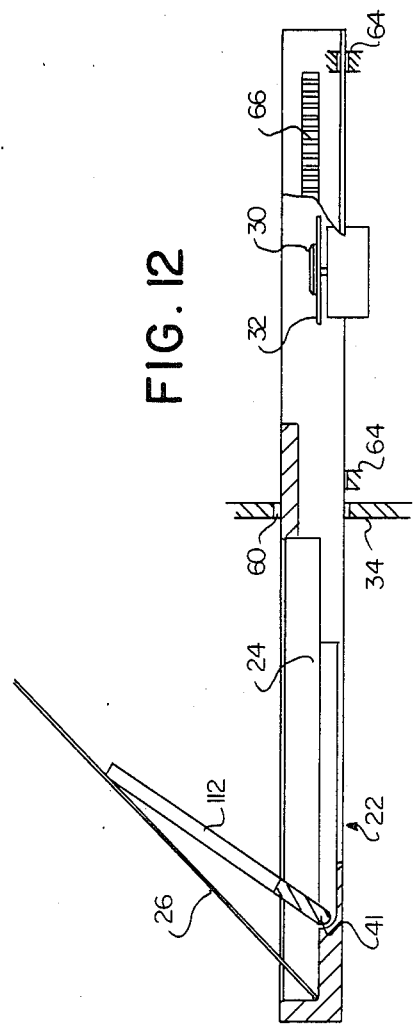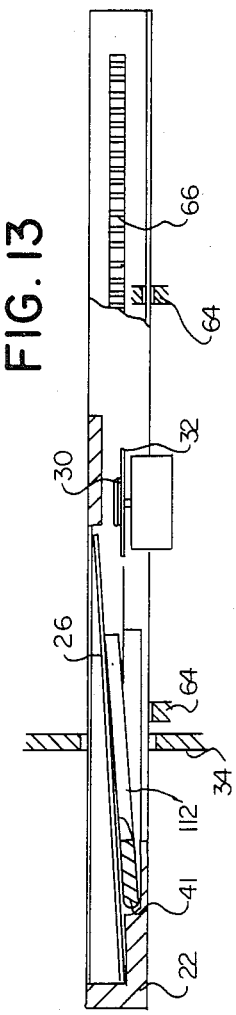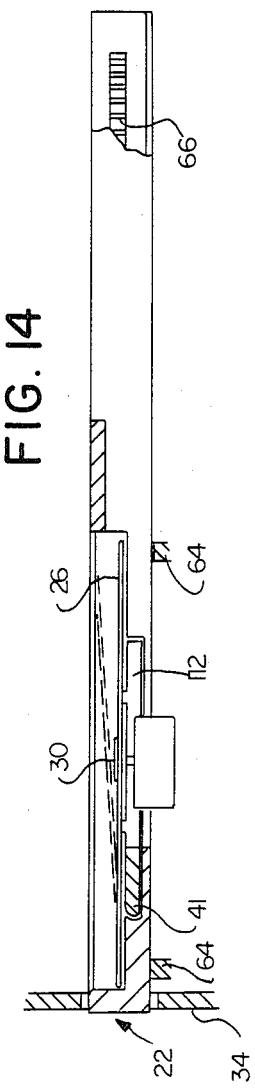

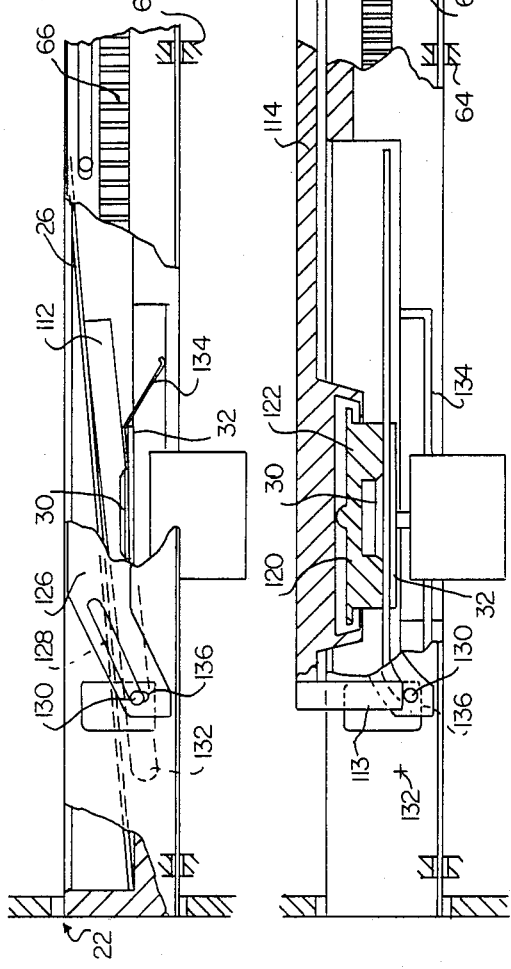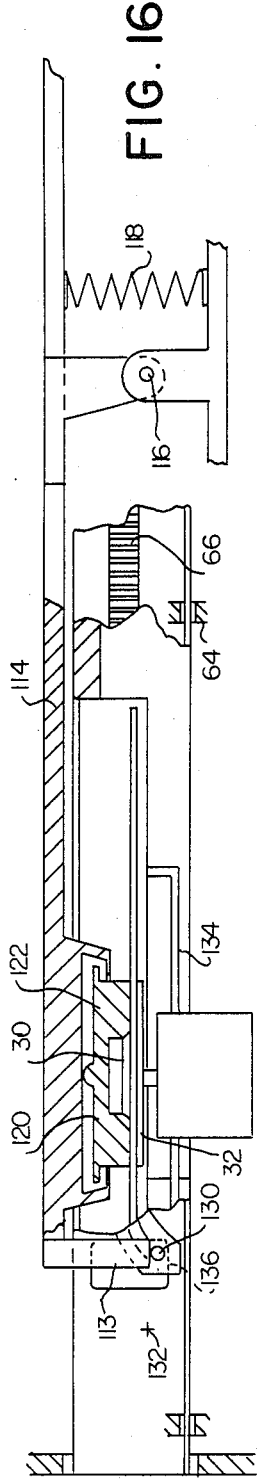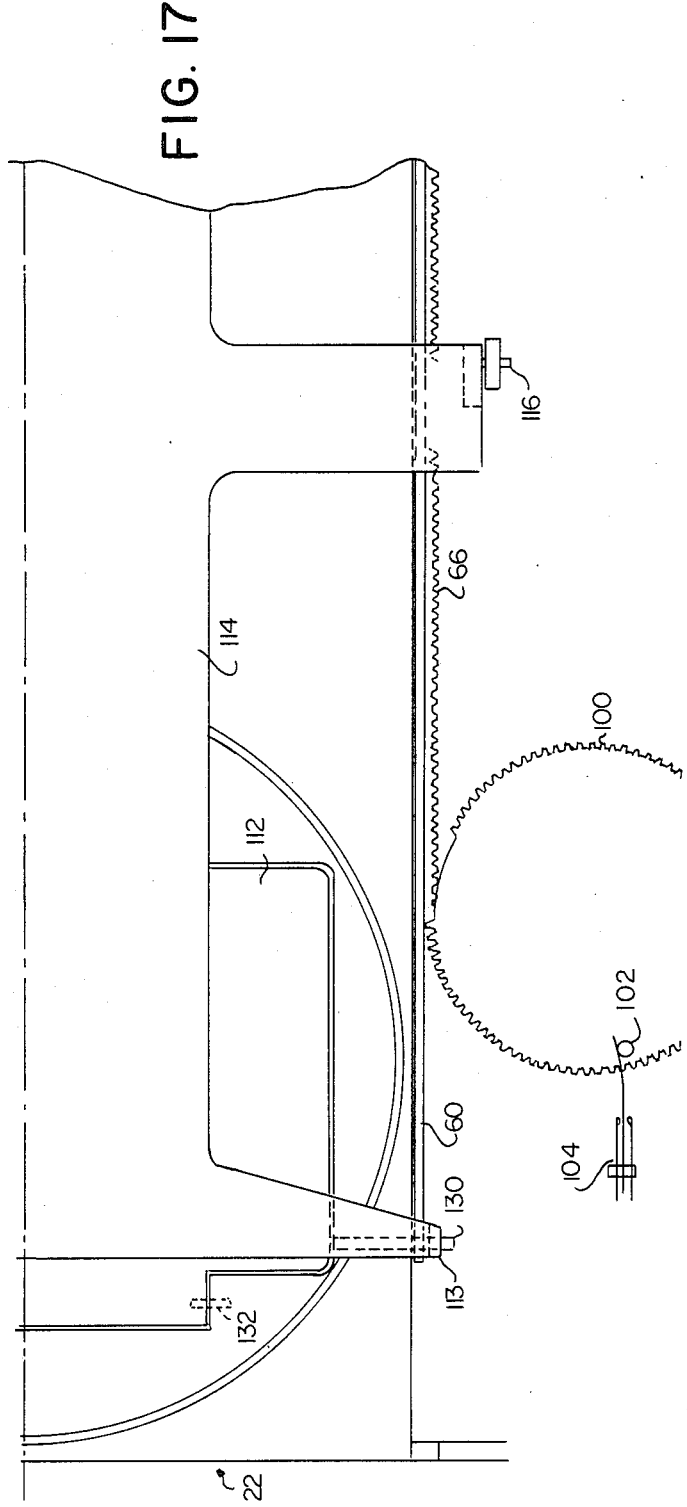

APPARATUS FOR LOADING AND UNLOADING RECORD DISC PLAYER

TECHNICAL FIELD

The present invention relates to an apparatus for loading and unloading record discs in record disc players and, more particularly, to apparatus for record discs carrying what is known as optical information, the reproduction of which is effected by laser. One type of such record discs, now widely provided in home music systems, as well as in other applications, is known as compact record discs or "CD" record discs.

BACKGROUND ART

The principle of optical reproduction and the extreme density of the information carried by these record discs makes them sensitive to spots, particularly to fingerprints and scratches, liable to interfere with the correct reproduction.

In order to avoid the risk of deterioration to the maximum extent, record disc players having a turntable adapted to drive compact record discs in a horizontal plane are generally provided with a loading and unloading mechanism having a drawer in which the user deposits the record disc with its recorded face in a horizontal plane, an arrangement which prompts the user to handle the record disc by its periphery, the record disc being positioned with precision in a centering recess provided in the bottom of the drawer. In order to bring the record disc into the reproduction position, a control knob provided for this purpose is actuated or a slight pressure is exerted on the front face of the drawer which is then displaced toward the interior of the apparatus by motorized means. At the end of the reproduction period or by a control means actuated by the user, the drawer is displaced outwardly and brings the record disc back to a loading/unloading position within reach of the user who recovers it by grasping it by its periphery, cut-out portions or depressions provided in the bottom of the drawer facilitating the user grasping the record disc by its periphery.

The disadvantage of this arrangement is that it only permits the correct and easy placing of the record disc in position in the drawer and its removal from the drawer when the player apparatus is at about table height, the handling of the record disc by its periphery becoming awkward and even problematical when the apparatus is placed much higher.

DISCLOSURE OF THE INVENTION

The main object of the present invention is to provide a remedy for the above disadvantage while retaining and even increasing the advantages of loading and unloading mechanism of the type which has a drawer.

An additional object is to make the loading and unloading of the record disc particularly easy in general in disc-playing apparatus equipped with a loading drawer.

Another object is to achieve the advantages enumerated above with complete reliability and by simple, and easily produced apparatus which, therefore, has a low cost.

According to the invention, the loading drawer is provided with a support means which, in the external loading/unloading position of the drawer, raises the record disc to an inclined position in relation to the drawer, the record disc facing the user, which facilitates the user gripping the record disc at its edges for placing it in or removing it from the drawer. During a loading operation, the record disc is pivoted into a substantially horizontal position which permits its loading by the horizontal displacement of the drawer. During an unloading operation, at the end of the horizontal outward displacement travel of the drawer, by a reverse pivotal movement the record disc is again raised to an inclined position in relation to the drawer, facing the user.

The support means for raising and lowering the record disc preferably embodies a support pivoting about a horizontal axis, the support assuming the raised and lowered positions under the action of control means operating either in the course of an extension of the travel of the drawer beyond that necessary for the complete removal of the record disc or after the stoppage of this travel.

In one of the preferred embodiments of the invention described above, means are provided which further increase the ease of loading, particularly by enabling the drawer to be controlled by a pressure exerted on the record disc after it has been placed in position.

In another embodiment, an intermediate position is provided for the pivoting support with the object of enabling it to serve to deposit the record disc on the driving turntable.

BRIEF DESCRIPTION OF THE DRAWINGS

Further objects and advantages of the invention will become apparent from the following description of the invention, taken in conjunction with the drawings, in which:

FIG. 1 represents a view in longitudinal section of a version of an existing loading and unloading mechanism with a drawer shown in the external position, the record disc having been placed on the drawer;

FIG. 2 represents the same mechanism with the drawer shown in its internal position;

FIG. 3 represents, in section, a first embodiment of the apparatus according to the invention in which the drawer is shown in its extended external position;

FIG. 4 represents, in longitudinal section, the first embodiment in the position where the drawer reaches the position corresponding to the usual outward movement of the drawer;

FIG. 5 illustrates a longitudinal section of the same embodiment in the final internal position of the drawer;

FIGS. 6 and 7 represent, respectively, a partial plan view and a view in longitudinal section of a second embodiment of the apparatus according to the invention in which the drawer is in the external position with a record disc on the drawer (FIG. 7);

FIGS. 8 and 9 represent, respectively, a plan view and a view in longitudinal section of the second embodiment of the invention at the end of the first loading phase (downward movement of the record disc into the horizontal position);

FIG. 10 is a view on the section line A—A in FIG. 8;

FIG. 11 illustrates a further embodiment of the apparatus of the invention;

FIGS. 12, 13, and 14 represent diagrammatically, in its three main positions, an embodiment of the invention where the record disc is maintained in an intermediate position to clear the spindle of the turntable of the record disc player upon inward movement of the drawer; and FIGS. 15, 16, and 17 illustrate details of he embodiment shown in FIGS. 12, 13, and 14.

BEST MODES FOR CARRYING OUT THE INVENTION

FIGS. 1 and 2 illustrate the conventional drawer-type front loading/unloading mechanism with the drawer 22 respectively in the external and internal positions in relation to the fixed housing 34 of the apparatus.

In the external position, the drawer 22 has a recess or depression 24 which is accessible from above for receiving the record disc 26 in a horizontal position on retractable supports 28 which hold it at a level enabling it to pass over the centering spindle (30) of the turntable 52 of the record disc player when the drawer is displaced towards the interior of the housing 34. After the record disc has been deposited, a mechanism controlled by a switch provided for this purpose or by a switch reacting to a pressure exerted on the drawer drives the drawer 22 by means of a rack 36 rigidly connected to the drawer and a motorized pinion (not shown), the drawer being guided by guides into its extreme internal position (FIG. 2) here the record disc 26, after having been brought with precision above the turntable 32, has been lowered onto the turntable following the downward movement of the supports 28 by means coming into action at the end of the inward horizonal travel of the drawer.

For the unloading operation of the record disc, the various steps take place in reverse, the record disc 26 is raised by the supports 28 to a level at which it does not interfere with the centering spindle 30, and the drawer 22 is then displaced out of the housing 34 toward its external position, illustrated in FIG. 1, in which the record disc can be removed by the user.

FIGS. 3, 4, and 5 illustrate a first embodiment of the invention in which the travel of the drawer 22 is extended outwards to an external loading/unloading position and in which the drawer is supported for horizontal movement to an intermediate position and an extreme internal operating position, carrying a record disc from a loading/unloading position to an internal operating position on the turntable 32. By comparison with conventional prior art apparatus, according to the present invention support means are carried on the drawer 22 and are engageable with a record disc 26 on the drawer for tilting the record disc into an inclined position facing upwardly and forwardly toward a front portion of the drawer when the drawer is in the loading/unloading position, as illustrated in FIG. 3. In this embodiment, the support means is provided by a support 40 which pivots about a horizontal axle 41 which is mounted transverse in relation to the drawer 22, this axle 41 being situated close to the front face of the drawer. In the raised position of FIG. 3, this support 40 occupies an inclined position in relation to the drawer 22. An actuating means is provided including a stud 42 formed on an arm 44 of the support 40 which is engaged by a stop 46 provided at the end of a slide 48 supported on the drawer 22 and having a second stop 50 at the opposite end engageable with a fixed member 52 of the housing 34. The slide 48 is guided by studs 54 on the drawer 22 and can be displaced longitudinally due to slots 56 receiving the studs 54. The second stop 50 limits the outward travel of the slide 48 accompanying the displacement of the drawer 22 and the slide 48 through the first stop 46 pivots the support 40 against the force of the return spring 58 as the drawer 22 continues its outward movement after the slide movement has been stopped.

In the extreme external position of the loading drawer 22, the pivoting support 40 constitutes a means for supporting the record disc in the front portion of the recess 24 adjacent the front of the drawer and in an inclined plane with the top surface of the record disc facing toward the front of the drawer and facing toward a user. In this position, if the plane of the record disc were to be extended toward the user, it would incline downwardly. The support 40 holds the record disc in this inclined or tilted position. During a loading operation, the drawer 22 is moved "in" toward its internal position where the record disc is placed on the turntable, as in existing apparatus. As a result of this displacement of the drawer 22 and of the support 40 in relation to the stop 46 of the slide 48, which is no longer held because the second stop 50 leaves the front member 52 of the housing 34, the support 40 is pivoted under the force of the spring 58 and assumes its lowered position (FIG. 4). At this moment, the record disc 26 is positioned as usual in the horizontal plane on the supports 28 as the drawer 22 moves through the opening 60 in the front of the housing 4, the record disc having been lowered so as to avoid interfering with the edge of the front panel member 52 of the housing 34.

In the extreme internal operating position of the drawer 22 (FIG. 5), the record disc 26 is then lowered into operating position on the turntable 32 following the lowering of the supports 28 by conventional means.

As indicated above in the brief description of existing drawer-type front loading devices, a large number of these permit the starting of the drive means for the drawer toward the internal position when, in the "external" position, a very slight displacement of the drawer is caused in the direction of the housing. This results from the action of the drawer on a switch, generally by means of the pinion which cooperates with the rack, driven in slight rotation by the latter.

It will be noted that the means provided in the embodiments described above permit the same slight displacement of the drawer necessary to start the drive means of the drawer following a slight pressure exerted not only on the drawer but also on the pivoting support in the raised position, particularly through the intervention of the record disc.

Referring to the embodiment illustrated in FIGS. 3, 4, and 5, for example, it will be understood that a pressure exerted on the record disc 26 in the direction of the housing 34 will cause the support 40 to pivot about its axle 41 and, through the stud 42 bearing against the first stop 46 of the slide 48, itself held in position by the second stop 50 in relation to the housing 34, to exert pressure on the drawer through its axle 41, causing the slight displacement of the drawer which, through known means, starts the means for displacing the drawer towards the interior of the unit. This displacement of the drawer 22 is caused by drive mechanism including a rack 62 rigidly connected to the drawer, the drawer being supported by means such as members 64 for in- and-out movement.

FIGS. 6 to 10 show another practical embodiment of the invention according to which the drawer 22 retains its normal outward travel.

For this purpose, instead of a rack rigidly connected to the drawer, as illustrated in FIGS. 1 and 2, a rack 66 is provided which is rigidly connected to a slide 68 carried by studs 70 fixed to the lateral side of the drawer 22. The slide 68 can be displaced longitudinally in relation to the drawer due to slots 72 which receive the studs 70.

The front portion of the slide 68 is further equipped with an inclined ramp 74 which acts on a pin 76 rigidly connected to the support 78 pivoting about an axle 80.

In this embodiment, locking means are provided for connecting and disconnecting the slide 68 carrying the rack 66 and the drawer 22. This locking means comprises, in the disclosed embodiment, a pin 82 carried by a lever 84 pivoting about a pin 86 rigidly connected to the drawer 22. The pin 82 can engage in a notch 88 provided in the slide 68 in order to lock the slide 68 to the drawer 22 or can be disengaged from the notch 88 in the slide 68 to unlock the slide from the drawer. In order to control the movement of the lever 84 and the pin 82, the lever 84 likewise carries a stud 90 which cooperates with a cut-out 92 in the form of a ramp provided in a cross piece 94 rigidly connected to the housing 34 of the apparatus. The lever 84 is further equipped with a resilient tongue 96 bearing against a stop 98 rigidly connected to the drawer 22 in such a manner as to exert a permanent thrust of the pin 82 toward the slide 68 and hence toward the notch 88.

During the outward movement of the drawer 22 under the effect of the rotation of a drive pinion 100, the rack 66 is thus rigidly connected or locked to the drawer 22 (FIGS. 8, 9 and 10).

When the drawer 22 approaches its extreme external position, the stud 90 engages in the cut-out 92 which causes the pivoting of the lever 84 and the emergence of the pin 82 from the notch 88 against the action of the resilient tongue 96. From then on, the rack 66 and the slide 68 are disconnected from the drawer 22 and can continue their outward movement, still driven by the pinion 100 FIGS. 6, 7).

Thus, when the drawer 22 has reached its extreme external position (FIG. 6), the ramp 74 of the slide 68 begins to act on the stud 90 and causes the pivoting of the support 78 about the axle 80, presenting the record disc 26 in an inclined plane raised from the recess 24 in the drawer 22.

At this moment, a stud 102 provided on the drive pinion 100 acts on a switch 104 to interrupt the feed of current to the electric motor (not shown) driving this pinion 100.

During the drawer movement in the loading operation, the same steps take place in reverse, and the rack 66 is first moved inward, causing the support 78 to be lowered into the substantially horizontal position and the positioning of the record disc 26 on its supports 28 before the drawer 22 has substantial movement toward the internal operating position.

Thus, the record disc is lowered to a safe, non-interfering position during both the loading and unloading operations.

FIG. 11 represents a modification of the embodiment described above in that the slide 68 carries, at its front portion, a link 106 articulated on the slide 68 at a pin 108 and connected by its other end to the stud 76 of the support 78. In this case, the travel of the stud 76 is limited in accordance with a slot 110 in the form of an arc of a circle.

As described above, known record disc player apparatus are generally equipped with retractable supports 28 which, during the horizontal displacement of the drawer 22, hold the record disc 26 at a raised level, enabling it to pass over the centering spindle 30 of the turntable 32 of the record disc player.

By means of the mechanism forming the subject of this invention, it is possible to provide a construction in which the record disc is held to pass above a centering spindle 30 during the horizontal displacement of the drawer 22 and according to which the record disc 26 is then lowered onto its drive means in the operating position by the support 78. FIGS. 12 to 17 show an example of this embodiment.

FIG. 12 shows the front loading drawer 22 in the extreme external loading/unloading position in relation to the housing 34. The record disc 26 is held, in accordance with this invention, in an inclined position by the support 112. Following initiation of a loading operation for placing the record disc 26 on the turntable 32 in operating position for reproduction, the record disc has been lowered into a substantially horizontal position which nevertheless allows it to pass through the opening 60 formed in the front of the housing 34.

This pivoting of the record disc 26 to the intermediate position (shown in FIGS. 13 and 15) is caused by the lowering of the support 112 under the action of control means as described above. Nevertheless, instead of the record disc being deposited in a raised horizontal position on supports 28, the support 40 holds the record disc in a sufficiently inclined position to pass over the drive means 30 during the horizontal displacement of the drawer 22.

When the drawer 22 reaches the extreme internal position (FIG. 14), the support 112 is lowered completely to lower and place the record disc 26 onto the turntable 32, and this is done by the intervention of the element normally provided in the apparatus to carry out the loading operation and causing the downward movement of the supports 28 of the record disc 26 (FIG. 4).

FIGS. 15 to 17 show an example of a practical embodiment of such a mechanism wherein elements are provided to act on the pivotable support 112 for a record disc in order to cause its downward movement (FIG. 16), herein shown as vertical projections 113 carried by a bridge 114 pivoting vertically about a pin 116 carried by the housing under the action of a spring 118. The bridge carries, at the end opposite its pivot point, a holder 120 for a magnetic ring 122 adapted to cooperate with the turntable 32 and its spindle 30 to clamp the record disc on the turntable when the drawer 22 has reached its extreme internal position, and this bridge 114 is released by the loading mechanism to the action of its spring 118.

Referring again to FIG. 15, the drawer 22 carries a record disc 26 held by the pivotable support 112 and a slide 126 carrying the rack 66. The slide 126 has a ramp 128 cooperating with a stud 130 on the support 112. The support 112 is pivotable about the axle 132.

In order to hold the record disc 26 in an intermediate, slightly inclined position, the travel of the ramp 128 has been limited and a spring leaf 134 has been provided to hold the support 112 in this position.

Furthermore, a vertical slot 136 has been provided, extending the oblique ramp 128 downward and enabling the stud 130 to move down at the desired moment.

FIG. 15 shows the drawer 22 in its extreme internal position, the record disc 26 having passed over the turntable spindle 30.

In order to place the record disc 26 in the operating position on the turntable 32, the pivoting bridge 114 is then lowered (FIGS. 16 and 17), and the vertical projection 113 acts on the stud 130 in such a manner as to push it to the end of the vertical slot 136 against the action of the leaf spring 134. As a result, the support 112 is lowered completely and held in a horizontal position below the record disc while the record disc 26 is clamped on the turntable 32 by the magnetic ring 120.

At this moment, the pinion 100 reaches its position of rest, the stud 102 having actuated the switch 104 in the other direction, and the record disc 26 is set in rotation for the reproduction of the information which it carries.

We claim:

1. A record disc player apparatus comprising:
    front loading means including a drawer supported for in-and-out substantially horizontal movement between an external loading/unloading position, wherein a front portion of said drawer projects externally of said apparatus, and an internal operating position; and
    support means carried by said drawer and engageable with a record disc on said drawer for raising and tilting the record disc into an inclined position with a major surface of the record disc facing upwardly and toward the front portion of said drawer when said drawer is in the loading/unloading position, and for lowering the record disc into a substantially horizontal position before said drawer is moved into the internal operating position.

2. An apparatus according to claim 1 including a housing having a front panel with an opening and wherein said drawer is supported for in-and-out movement through the opening in said front panel and including:
    actuating means acting to raise said support means on said drawer to tilt a record disc from a substantially horizontal position as an incident to out movement of said drawer from the operating position to raise the record disc to an inclined position where a portion of the record disc is above the opening after the portion clears the opening.

3. An apparatus according to claim 1 including actuating means acting to raise said support means on said drawer to tilt a record disc as an incident to out movement of said drawer toward the loading/unloading position from the operating position so as to present the record disc to a user in an inclined position which facilitates the user gripping the record disc, and acting to lower said support means to lower the record disc into a substantially horizontal position as an incident to in movement of said drawer from said loading/unloading position.

4. An apparatus according to in claim 3 wherein said drawer includes vertically movable members to raise and lower a record disc in a horizontal plane for loading a record disc onto a turntable, and said support means tilts a record disc into an inclined position from and lowers a record disc onto said movable support members.

5. An apparatus according to claim 3 wherein said support means comprises a pivotally mounted support and said actuating means acts to pivot said support and raise and lower the record disc between the inclined and substantially horizontal positions as an incident to in-and-out movement of said drawer.

6. An apparatus according to claim 5 wherein said actuating means includes a slide carried by said drawer and having a first stop engageable with a fixed member of said apparatus upon movement of said drawer toward the loading/unloading position, and a second stop operatively engageable with said support for raising said support upon such relative movement of said drawer.

7. An apparatus according to claim 6 wherein said slide has slots cooperating with studs carried by said drawer in such a manner that said slide does not prevent said drawer from moving to the loading/unloading position when said first stop engages said fixed element in the course of movement of said drawer to the loading/unloading position.

8. An apparatus according to claim 7 wherein said first and second stops are spaced and arranged to cause said support to pivot and raise the record disc to an inclined position with a portion of the record disc above the opening after the portion has cleared the opening.

9. An apparatus according to claim 6 including resilient means acting to pivot said support to lower the record disc upon movement of said drawer to the operating position in a loading operation.

10. An apparatus according to claim 5 including a drive mechanism for displacing said drawer in its in-and-out movement including a control member movable relative to said drawer to a limited extent and connected to pivot said support during such limited relative movement.

11. An apparatus according to claim 10 wherein said control member is connected rigidly to said drawer for a major portion of its travel corresponding to normal translation of said drawer in loading and unloading operations and released from said drawer during an extended portion of its travel toward the loading/unloading position for relative movement to cause the pivoting of the support.

12. An apparatus according to claim 11 including a loading and unloading mechanism having a pinion, and wherein said control member comprises a slide mounted for longitudinal displacement on a lateral wall of said drawer, said slide carrying a rack driven by said pinion of said loading and unloading mechanism.

13. An apparatus according to claim 12 including locking means ensuring that movement of said drawer produces movement of said slide during the normal translation of said drawer.

14. An apparatus according to claim 13 wherein said locking means comprises a lever pivotally mounted on said drawer, a pin carried by said lever, and resilient means acting on said lever to push said pin into a recess provided in said slide during the normal translation of said drawer.

15. An apparatus according to claim 14 wherein said lever carries a stud, means providing a cut-out portion in the form of a fixed ramp in which said stud is received in such a manner as to cause said lever to pivot and to disengage said pin to disconnect said slide from said drawer.

16. An apparatus according to claim 14 wherein said locking means is carried by said apparatus and retains said drawer in a loading/unloading position until said slide is moved and said pin is pushed into said recess in the course of a following loading operation.

17. An apparatus according to claim 12 wherein said support is pivotally mounted on said drawer and includes a stud, and said control member cooperates with said stud to pivot and raise and lower said support upon movement of said control member relative to said drawer.

18. An apparatus according to claim 17 wherein said control member includes a ramp.

19. An apparatus according to claim 17 wherein said control member includes a link.

20. An apparatus according to claim 2, said apparatus having a turntable with a centering spindle, and including means for tilting the record disc to a slightly inclined intermediate position as an incident to in movement of said drawer in which intermediate position the record disc will pass through the opening of the front panel without hitting the housing, for lowering the record disc from the intermediate position into an extreme lowered horizontal position when the record disc is placed in the operating position on the turntable, and for raising the record disc to the intermediate position as an incident to out movement of the drawer to avoid hitting the housing when the record disc is unloaded.

21. A record disc player apparatus comprising:
front loading means including a drawer supported for in-and-out substantially horizontal movement between an external loading/unloading position, wherein a front portion of said drawer projects externally of said apparatus, and an internal operating position;

support means carried by said drawer and engageable with a record disc on said drawer for raising and tilting the record disc into an inclined position with a major surface of the record disc facing upwardly and toward the front portion of said drawer when said drawer is in the loading/unloading position, and for lowering the record disc into a substantially horizontal position before said drawer is moved into the internal operating position; and actuating means connected to said drawer for limited relative movement and for joint movement, being operable during joint movement to move said drawer in-and-out of said apparatus and during relative movement to lower and raise said support means on said drawer to lower and raise a record disc between a tilted position and a substantially horizontal position.

* * * * *